United States Patent [19]

Anderson

[11] Patent Number: 4,793,124
[45] Date of Patent: Dec. 27, 1988

[54] BALE WRAPPING MACHINE

[76] Inventor: David W. Anderson, Avaulds, Turriff, Aberdeenshire, Great Britain, AB5 7RY

[21] Appl. No.: 151,911

[22] Filed: Feb. 3, 1988

[30] Foreign Application Priority Data

Jun. 30, 1987 [GB] United Kingdom ................ 8715345

[51] Int. Cl.$^4$ ............................................. B65B 13/12
[52] U.S. Cl. ........................................ 53/588; 53/556
[58] Field of Search ................... 53/576, 556, 588, 211

[56] References Cited

U.S. PATENT DOCUMENTS

| 4,050,220 | 9/1977 | Lancaster | 53/556 |
| 4,594,836 | 6/1986 | Good | 53/576 X |
| 4,641,484 | 2/1987 | Popelka | 53/587 X |

Primary Examiner—John Sipos
Attorney, Agent, or Firm—Lalos & Keegan

[57] ABSTRACT

A bale wrapping machine comprises a wheeled base frame (1, 2) having a bale-receiving cradle (3) followed by a bale-wrapping device and a roller bed (8) sloping down to ground level. The cradle (3) comprises a support of rollers (4) along which a bale can be translated into the bale-wrapping device and a hydraulic ram device (5, 6) for translating the bale over the rollers (4). The bale-wrapping device is located at a gap between the beds of rollers (4 and 8) and comprises a hoop arrangement through which bales can be translated by the device (5, 6). The hoop arrangement includes an inner fixed hoop, an outer rotary hoop (10) rotatable coaxially with the fixed hoop, a reel (12) for plastics strip carried by the hoop (10) and drive means for the hoop (10).

2 Claims, 4 Drawing Sheets

BALE WRAPPING MACHINE

DESCRIPTION

This invention relates to a bale wrapping machine.

The conventional manner of producing silage from grass is either to lay a bed of grass in a barn and flatten it by, say running a tractor thereover, in order to expel air therefrom and then covering the flattened grass or to pack the grass into a pit and then cover the pit.

Early attempts at producing silage from the large round bales of grass by wrapping involved simply placing each bale in a separate plastic bag. A disadvantage of this was that because the plastic sheeting of the bag was loose in some areas about the bale it was left to flap in the wind and thus developed pin-holes which let in air to harm the silage process.

A more recent advance in wrapping the large round bales of grass involved placing the bale between two rollers on a turntable. The rollers rotated so that the bale rotated about its own axis which was horizontal and the turntable rotated about a vertical axis so that the bale rotated about two mutually perpendicular axes. At the same time a plastic strip was fed from a reel rotating about a fixed vertical axis spaced from the axis of the turntable. In this way each bale was separately swathed in a plastic strip. A disadvantage of this method is the large amount of plastic strip needed to wrap each bale.

An object of the invention is to obviate or mitigate the above disadvantages.

According to the invention there is provided a bale wrapping machine comprising a wheeled base frame having a bale-receiving cradle followed by a bale-wrapping device and a roller bed sloping down to ground level, the bale-receiving cradle comprising a support along which a bale can be translated into the bale-wrapping device and a hydraulic ram device for translating the bale along the support, the bale-wrapping device being located at a gap between the support and the roller bed and comprising a hoop arrangement through which bales can be translated by the hydraulic ram device, the hoop arrangement including a fixed hoop, a rotary hoop rotatable coaxially with the fixed hoop, a reel for plastic strip carried by the rotary hoop and drive means for the rotary hoop.

An embodiment of the invention will now be described, by way of example, with reference to the accompanying drawings, in which.

Figure 1:
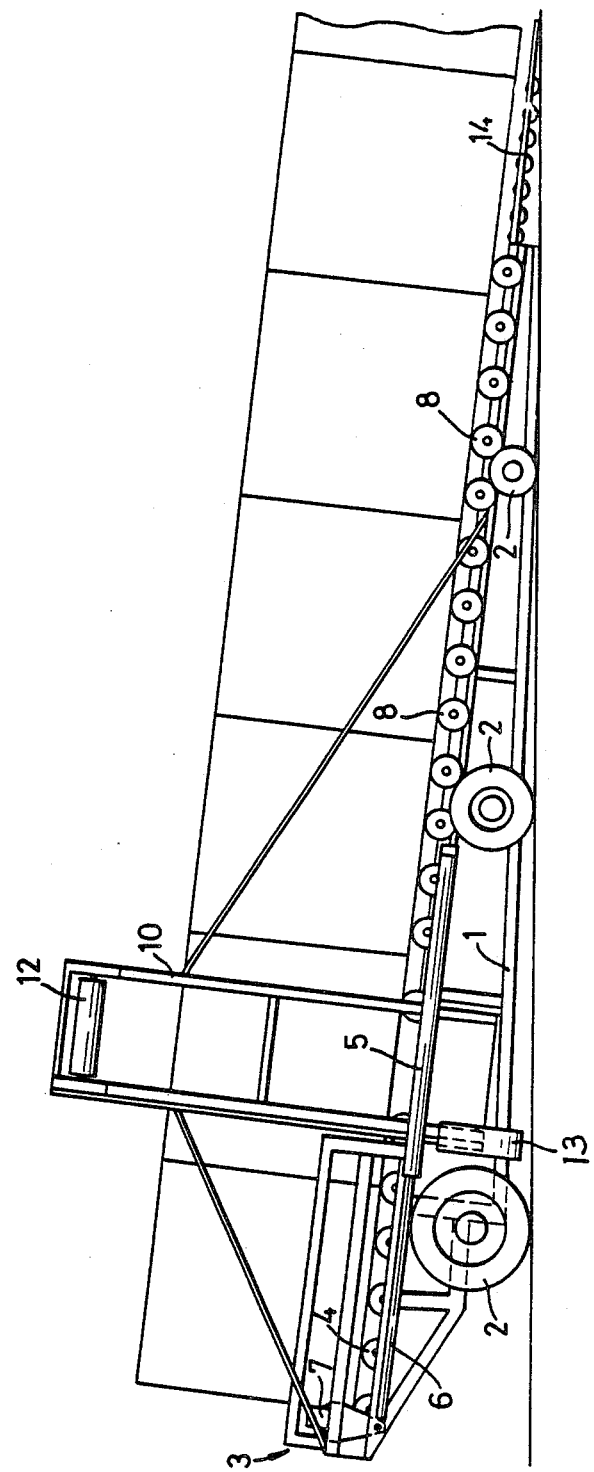
FIG. 1 is a side view of a bale wrapping machine.
Figure 2:
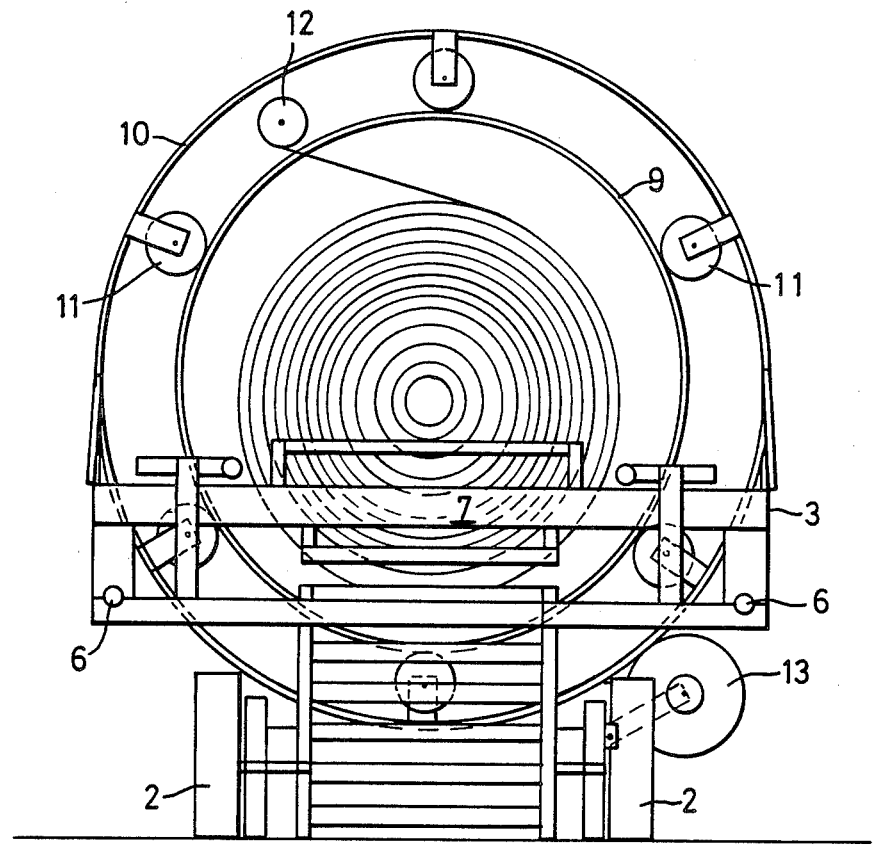
FIG. 2 is a front end view of the machine in FIG. 1.

In the drawings, a bale wrapping machine comprises a base 1 having wheels 2. A bale-receiving cradle 3 is provided at the front end of the machine and this includes a support having a short bed of rollers 4 which could be replaced by slide rails. The cradle also includes a hydraulic ram device having two side-mounted cylinders 5, pistons having rods 6 and a cross bar 7 which moves over the bed of rollers 4.

The machine also includes a bale-wrapping device located at a gap between the bed of rollers 4 and a longer bed o rollers 8 which slopes downwards and rearwards to ground-level. The bale-wrapping device comprises an inner fixed hoop 9 and an outer rotatable hoop 10 which carries wheels 11 which roll about the hoop 9. The hoop 10 also carries a reel 12 of plastic strip and is driven by a friction wheel 13 which is itself driven by a hydraulic motor.

In operation, large round bales are loaded one-by-one onto the cradle 3 with the hydraulic ram device extended. The ram is then retracted so that the bale is pushed into the hoop arrangement and bridges the gap between the beds of rollers 4 and 8. At the same time, the hoop 10 is rotating so that the bale is being wrapped with plastic strip from the reel 12. Once a succession of wrapped bales is established and extends rearwardly to the ground they serve as a anchor against which acts the hydraulic ram device so that the machine is advanced along and ahead of a row or column of wrapped bales lying on the ground.

The first and last bales are covered in plastic bags which are open towards the remainder of the bales in the column and are thereafter wrapped in the plastic strip.

It is important to note that the bales are prevented from falling down the gap between the beds of rollers 4 and 8 by being compressed end-to-end by the hydraulic ram device. The provision of a gap enables the plastic strips to pass under the bale for wrapping.

The speed at which the hydraulic ram device is retracted has a bearing on the speed at which the plastic strip is applied. Stopping and starting the wrapping is also timed to coincide with the movement of the hydraulic ram device. These matters may either be left to the judgment of the operator or can be dealt with automatically. Ideally, the machine is steerable so that any tendency for the machine to wander off a straight line can be corrected.

The machine may be used with a tractor alongside and employing its engine and hydraulics. Alternatively, a donkey engine driving a hydraulic pump may be mounted on the machine.

The machine may be transported to and from its place of operation by folding up a trailing bed of small rollers 14 at the rear of the machine and fixing a removable drawbar at the front.

When loading the machine with bales at the commencement of a column, two extension bars may be disposed one on each side of the cradle and used to support the first three or four bales across the gap. These bars are then removed to allow wrapping to take place.

The machine is normally emptied of bales by moving through it unwrapped straw bales after the column of wrapped bales. Once the machine is free of the column of wrapped bales the unwrapped bales left on the machine can be removed from the side by stabbing. Alternatively, the double-acting property of the hydraulic ram device may be used with a length of webbing extending from one end of the cross bar 7 back to a pulley at the rear of the machine on one side, forward to and across the front end of the last bale, back to a pulley at the rear of the machine on the other side, and then forward again to the other end of the cross bar 7. Each extension of the hydraulic ram device pulls the machine forward by one bale's length whereupon the hydraulic ram device is retracted and the slack in the webbing is taken up before the hydraulic ram device is extended again.

Figure 3:
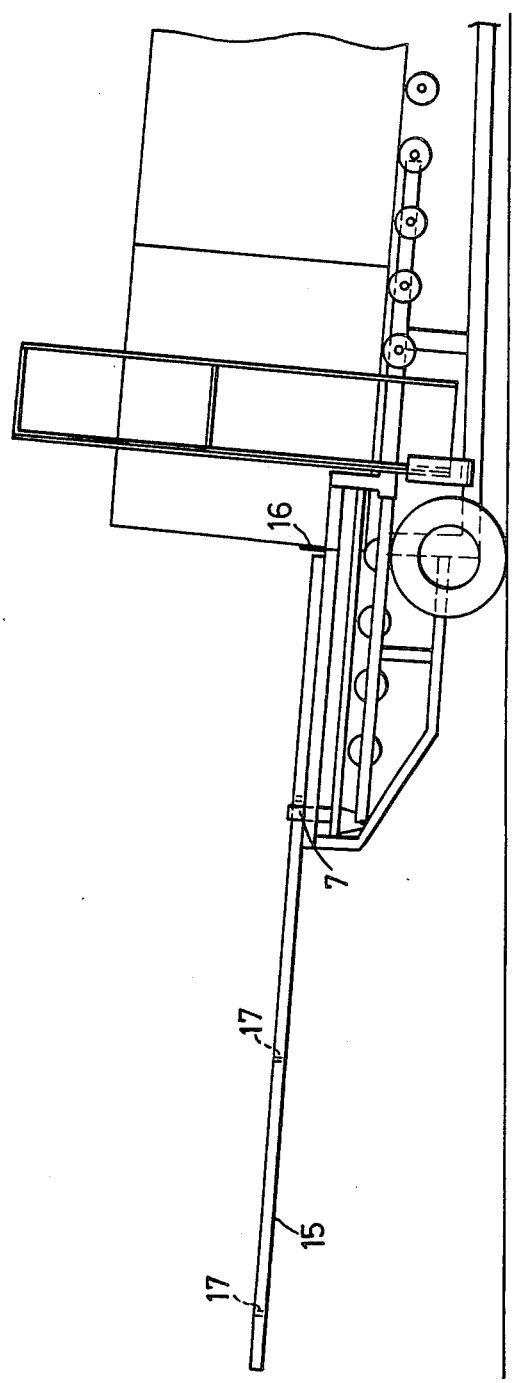
FIG. 3 is a side view of the front portion of the machine showing a means of emptying the machine.

Another means of emptying the machine is shown in FIG. 3, wherein a pole assembly 15 has a flat plate 16 removably attached at one end thereof and pin-receiving holes 17 equally spaced apart along its length. In use the pole assembly 15 is inserted through a hole in the cross bar 7 with the plate 16 engaging the front end of the last bale. With the hydraulic ram device fully extended a removable pin is inserted in the hole 17 which is immediately behind the cross bar 7. The ram device is then retracted to push on the last bale and move the machine forward. The ram device is again extended and the pin removed and put in the next hole 17 and so on until the machine is emptied. For ease of handling, the pole assembly 15 is made up of at least two poles removably attached to each other end-to-end.

Figure 4:
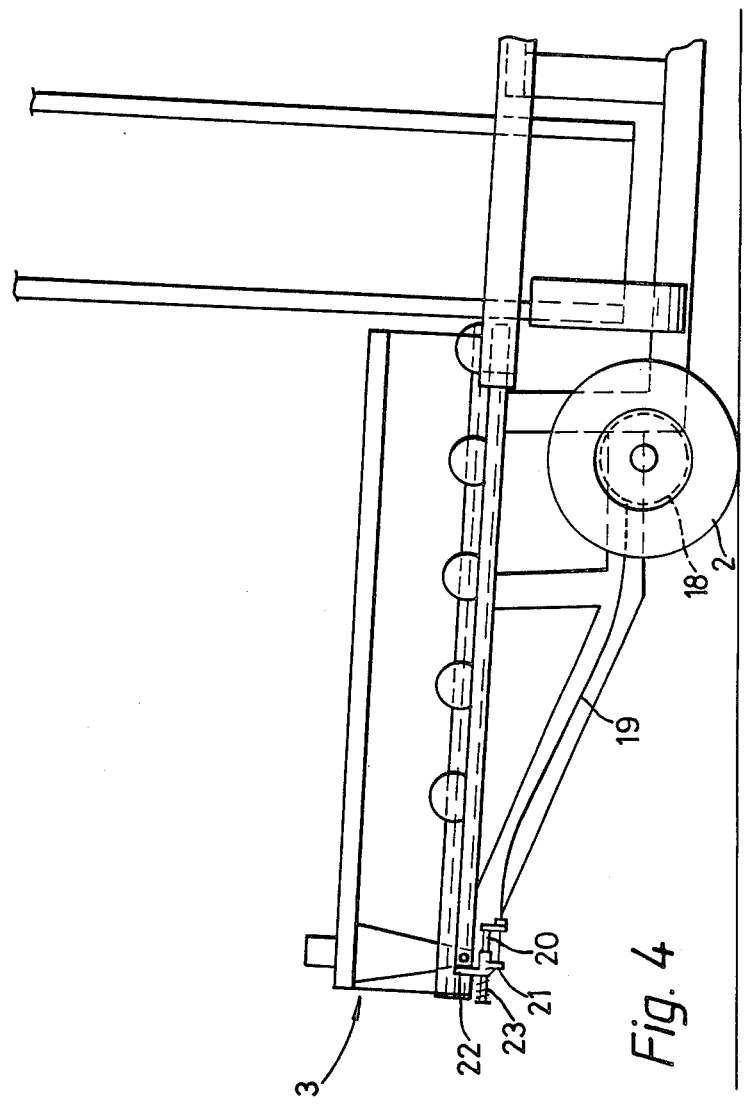
FIG. 4 is also a side view of the front portion of the machine showing a means of braking the machine when it is being loaded with bales to be wrapped.

The bales are usually loaded one-by-one onto the cradle 3 by stabbing and lifting onto the machine from the front thereof. It has been found that careless withdrawal of the loading spikes from the bale can result in the machine being pulled forward and thus rupturing the plastic strip between the bales on the ground and those on the machine. An arrangement to avoid this is shown in FIG. 4 wherein a brake 18 on the wheel 2 is actuated via a Bowden cable 19. The sleeve of the cable 19 at its end remote from the brake 18 is attached to a fixed part of the machine under the forward end of the cradle 3 where a guide rod 20 is provided. The corresponding end of the core of the cable 19 is attached to a slide 21 slidable on the rod 20. The slide 21 also has an abutment 22 engageable by the ram device when fully extended in order to apply the brake 18. A compression spring 23 is provided to bias the brake 18 against application. Thus the brake 18 is only applied when the ram device is fully extended. Otherwise the machine is free to be moved forward.

I claim:

1. A bale wrapping machine comprising a wheeled base frame having a bale-receiving cradle followed by a bale-wrapping device and a roller bed sloping down to ground level, the bale-receiving cradle comprising a support along which a bale can be translated into the bale-wrapping device and a hydraulic ram device for translating the bale along the support, the bale-wrapping device being located at a gap between the support and the roller bed and comprising a hoop arrangement through which bales can be translated by the hydraulic ram device, the hoop arrangement including a fixed hoop, a rotary hoop rotatable coaxially with the fixed hoop, a reel for plastic strip carried by the rotary hoop and drive means for the rotary hoop.

2. A machine according to claim 1, wherein the fixed hoop is radially inward of the rotary hoop.

* * * * *